United States Patent [19]

Johansson

[11] Patent Number: 4,617,751
[45] Date of Patent: Oct. 21, 1986

[54] FISHING TACKLE WITH A FIBER OPTIC LIGHT GUIDE AS THE FISHING LINE

[76] Inventor: Håkan Johansson, 159 Vintervägen, S-722 31 Västerås, Sweden

[21] Appl. No.: 667,490

[22] PCT Filed: Feb. 23, 1984

[86] PCT No.: PCT/SE84/00063
§ 371 Date: Oct. 18, 1984
§ 102(e) Date: Oct. 18, 1984

[87] PCT Pub. No.: WO84/03198
PCT Pub. Date: Aug. 30, 1984

[30] Foreign Application Priority Data
Feb. 25, 1983 [SE] Sweden .................. 8301056

[51] Int. Cl.⁴ .................. A01K 85/01; A01K 91/00
[52] U.S. Cl. .................. 43/17.5; 43/17.6; 43/44.98; 362/32
[58] Field of Search .................. 43/17.5, 17.6, 17.1, 43/44.98; 362/32; 350/96.1

[56] References Cited

U.S. PATENT DOCUMENTS

| | | | |
|---|---|---|---|
| 2,711,044 | 6/1955 | Woods | 43/17.6 |
| 3,449,036 | 6/1969 | Jacobsen | 362/32 X |
| 3,829,675 | 8/1974 | Mariani | 350/96.1 X |
| 4,117,618 | 10/1978 | Utsler | 43/17.5 |
| 4,420,796 | 12/1983 | Mori | 362/32 |
| 4,501,084 | 2/1985 | Mori | 43/17.5 |

*Primary Examiner*—Nicholas P. Godici
*Assistant Examiner*—Carmine Cuda
*Attorney, Agent, or Firm*—Cushman, Darby & Cushman

[57] ABSTRACT

A fishing tackle for catching fish with a fishing line (1) constituting a light guide, at one end of which the light from a natural or artificial light source can be focused, and at the other end of which a bait (3) with reflecting, luminescent, transmittent or light-scattering properties is located. In certain embodiments the fishing tackle also comprises an opto-electronic energy transformer, an electric energy storage circuit, an optic beam splitter and a light detector.

10 Claims, 6 Drawing Figures

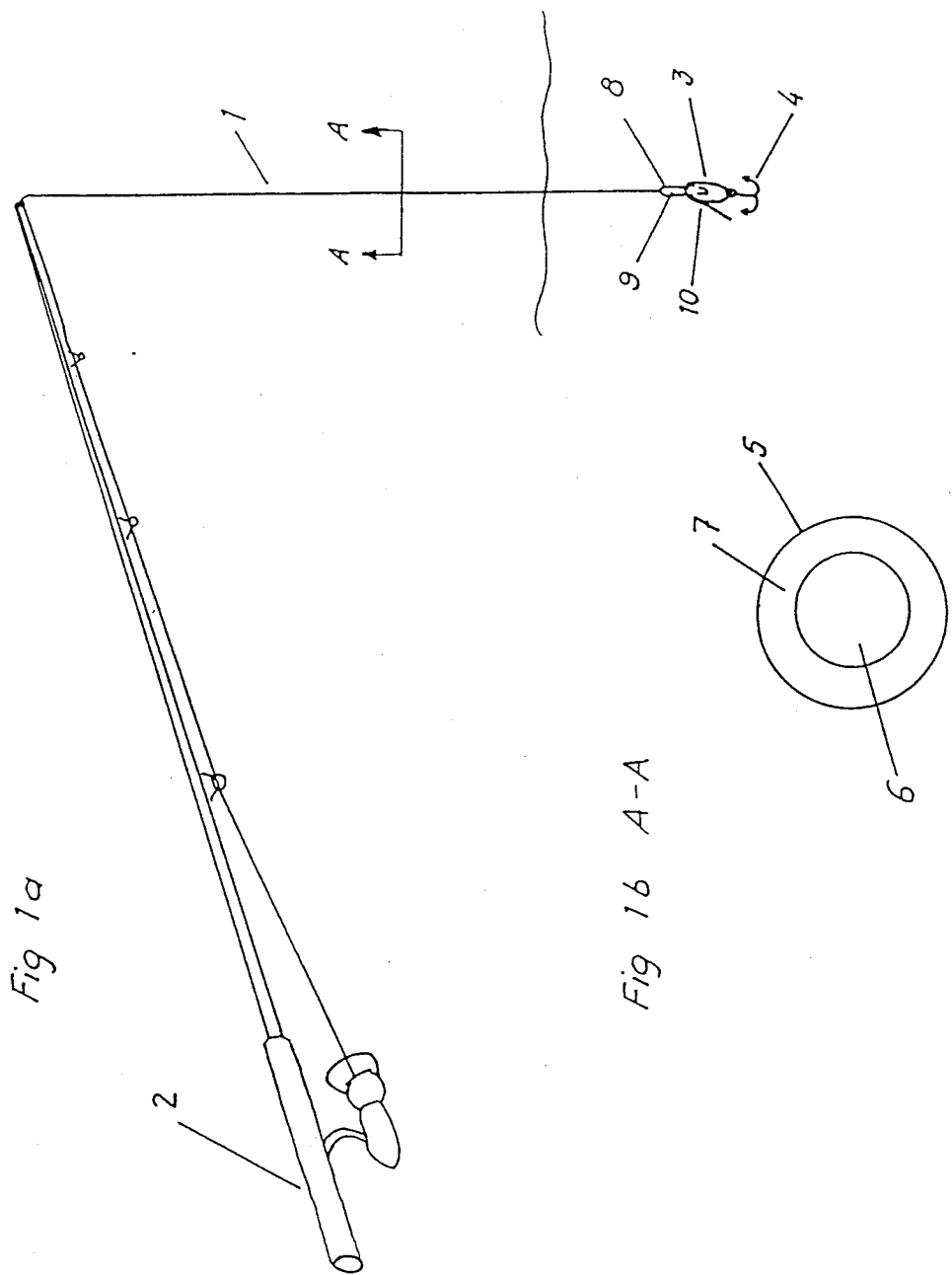

FISHING TACKLE WITH A FIBER OPTIC LIGHT GUIDE AS THE FISHING LINE

FISHING TACKLE

Fishing tackle for catching fish has been subject of mankind's inventive imagination during all comprehensible time of history. The principle of luring the prey by bait and attaching to the bait an arresting member, for example a hook, is well-known. Baits with all imaginable kinds of shapes and colours have been described and become available on a growing market for recreational fishing.

One difficulty in connection with the use of bait is to call the attention of the prey to it. This is especially difficult in muddy waters with poor visibility. This is the case in a great proportion of lakes with clayey bottom where the species, which are of interest for the leisure time angler, often are found.

The present invention has the object to solve this problem by means of a fishing line, which comprises, or consists of a light guide, by which the bait can be lighted-up and thereby attract the attention of the prey..

Figure 2A:
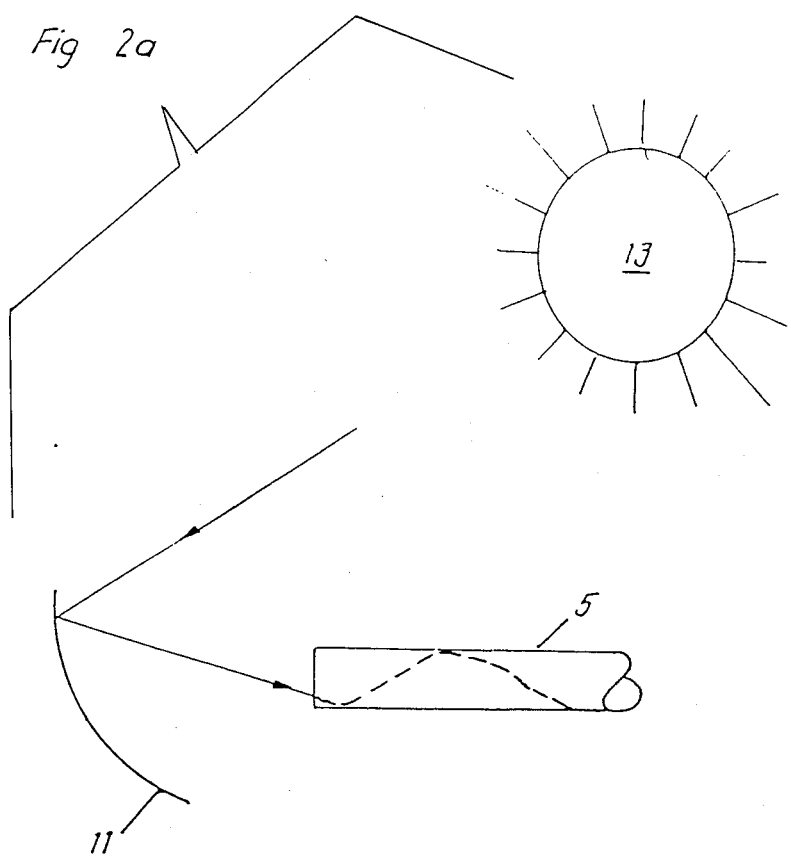
Figure 2B:
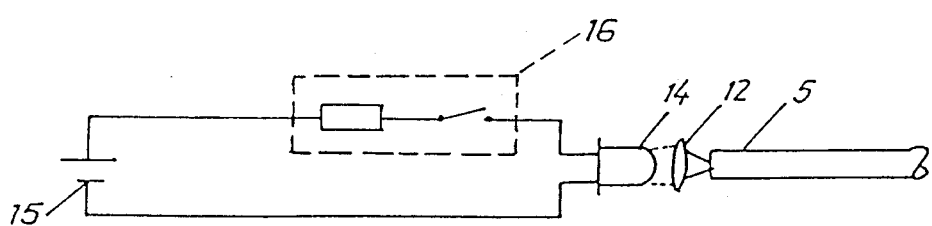
Figure 3:
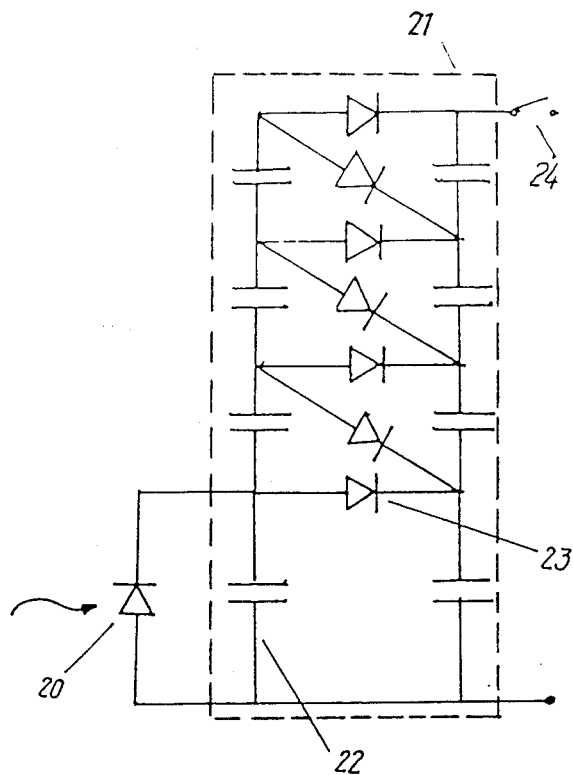
Figure 4:
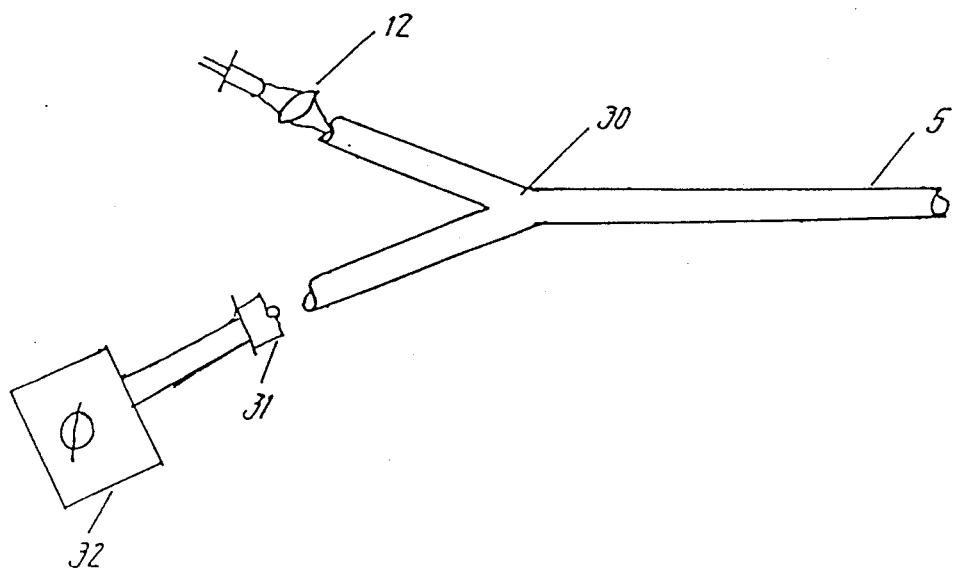

The characterizing features of the invention become apparent from the attached claims and drawings, in which FIG. 1 shows the fishing tackle in its entirety, FIG. 2 shows embodiments of light connection to the light guide, FIG. 3 shows an embodiment of the bait comprising energy transformer and energy storage unit, and FIG. 4 shows an embodiment comprising an optical beam splitter and a light detector.

As appears from FIG. 1, the fishing tackle comprises a fishing line 1, which connects a hand tool 2 to the bait 3. The fishing line 1 comprises, or consists of a light guide 5 consisting of two concentric portions, a core 6 and an enclosing casing 7. The core has good optical transmission properties, and its refractive index is higher than that of the casing. The material of the core may be plastic, for example polymethyl-methacrylate or polystyrene, or glass, while the casing, besides these material classes, can be manufactured of silicone-rubber.

The bait 3 comprises an arresting member 4, for example a hook, for retaining the prey lured thereto. At a preferred embodiment, a separate coupling member 8 is also provided, by which the bait 3 can be hooked on the fishing line and easily be removed and replaced by a bait of a different detail design. The coupling member 8, therefore, consists of two portions 9,10 whereof portion 9 is rigidly connected to the fishing line 1, and portion 10 is rigidly connected to the bait 3. The bait 3 is made of a material with reflecting, luminiscent, light-scattering or transmitting properties.

In FIG. 2 the connection of light sources to the light guide 5 is shown. In FIG. 2(a) a natural light source, the sun 13, is utilized, of which the substantially parallel pencil of rays is focused on one end of the light guide 5 by means of a reflector 11 with spheric, parabolic or similar reflection surface.

FIG. 2(b) shows the connection of an artificial light source, for example a light emitting diode, by means of a lens 12 according to known art. The light source is provided with electric drive means, for example a battery 15, and a mechanical or electronic control means 16, by which the light intensity can be varied.

FIG. 3 shows an embodiment where light incident to the bait partially is incident to an opto-electronic energy transformer, for example a photo-diode 20, whereby the optical energy is transformed to electric energy, and an energy storage circuit 12 for storing the electric energy generated. At the embodiment shown, the energy storage circuit 21 is a so-called voltage doubler comprising diodes 23 and capacitors 22. In this circuit a high output voltage is generated which upon closing of the microswitch 24 can be caused to be released to the prey. It is hereby possible by the electric energy to stun, kill or retain the prey.

The embodiment shown in FIG. 4 is intended for detecting events at the bait, for example the catch of a prey, by the detection of variations in the optic signal transmitted by the light guide in the direction from the bait. A beam splitter 30 is provided to render it possible to simultaneously emit light in the way described above by a light-collecting element 12 and a light source 14 and to detect light reflected in a light detector 31. This detector in its turn is coupled together with an indicator unit 32, which by optic or acoustic signals indicates variations in the reflected light intensity.

The invention can be varied in many ways within the scope of the attached claims.

What I claim is:

1. A fishing tackle for catching fish, comprising a hand tool, a fishing line connected to the hand tool and a bait including an arresting member and connected to the fishing line, the fishing line comprising a least one light guide in the form of an optic connection between the hand tool and the bait for transmitting light to the bait to light up the same and comprising a core and a cladding, the core having a higher refractive index than the cladding, means for introducing light from a light source into the light guide at the hand tool, and coupling means connecting the light guide to the bait, the bait being capable of emitting light transmitted thereto from said light source via the light guide, said coupling means comprising at least two portions separable from each other, one portion being rigidly connected to the light guide and a second portion being rigidly connected to the bait.

2. A fishing tackle as in claim 1, wherein the means for introducing light into the light guide includes at least one optical beam-splitter and at least one light-collecting element.

3. A fishing tackle as in claim 2, wherein the light-collecting element includes focusing means capable of focusing light from the light source to a light-introducing end of the light guide.

4. A fishing tackle as in claim 3, wherein the focusing means includes an optical reflector.

5. A fishing tackle as in claim 3, wherein the focusing means includes an optical refractor.

6. A fishing tackle as defined in claim 1, wherein the bait has a shape and a color imitating a typical prey for the intended catch.

7. A fishing tackle for catching fish, comprising a hand tool, a fishing line connected to the hand tool and a bait including an arresting member and connected to the fishing line, the fishing line comprising at least one light guide in the form of an optic connection between the hand tool and the bait for transmitting light to the bait to light up the same and comprising a core and a cladding, the core having a higher refractive index than the cladding, means for introducing light from a light source into the light guide at the hand tool, and coupling means connecting the light guide to the bait, the bait being capable of emitting light transmitted thereto from said light source via the light guide, said bait comprises at least one energy transformer including a photodiode, for transforming light energy to electric energy, and at least one electric energy storage circuit comprising at least one capacitor.

8. A fishing tackle as in claim 7 including at least one release means including a micro-switch for releasing the electric energy stored in the energy storage circuit for retaining, killing or stunning the catch.

9. A fishing tackle as in claim 2, wherein the optical beam-splitter is connected to a light detector for detecting light reflected through the light guide from the bait.

10. A fishing tackle as in claim 9, wherein the light detector is connected to an indicator unit capable of indicating variations in intensity of the reflected light.

* * * * *